Figure 1:
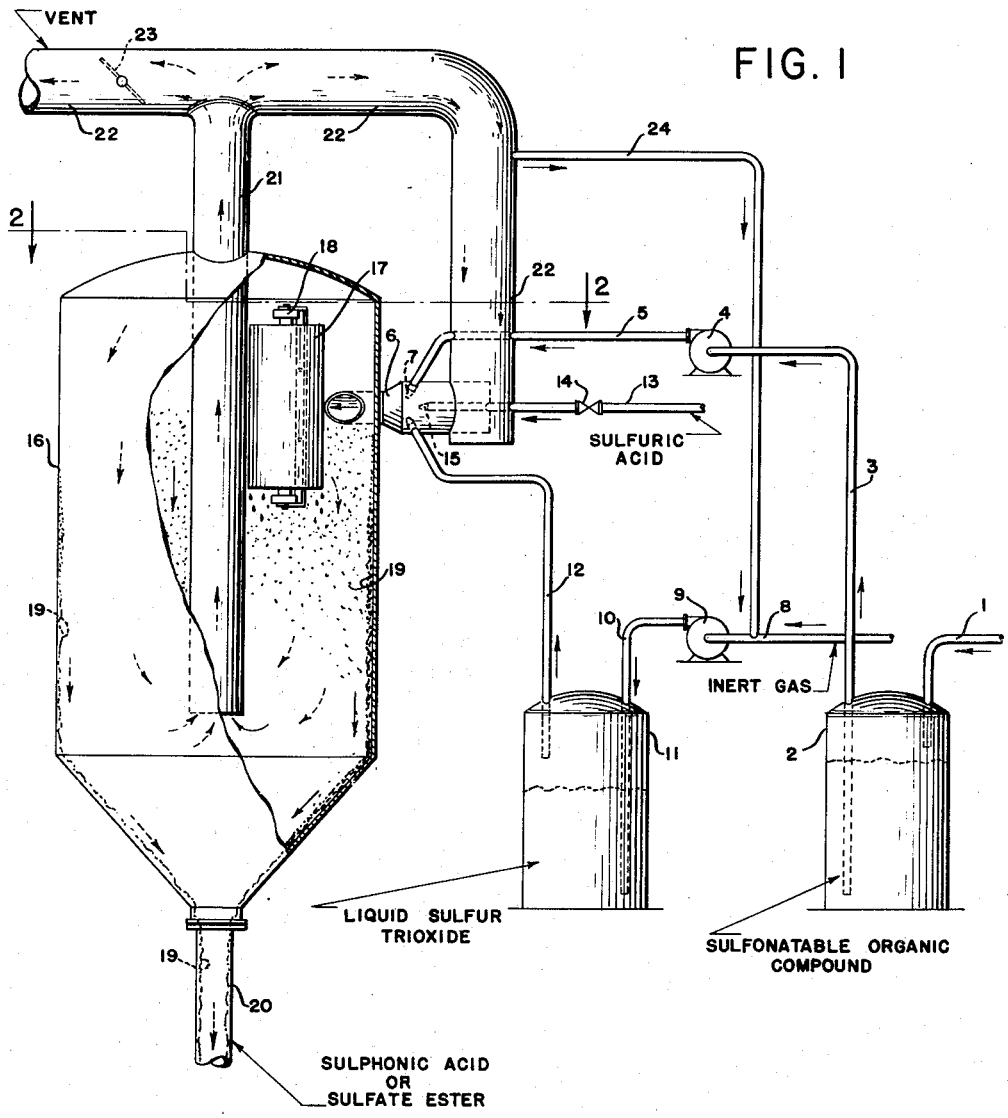

Dec. 14, 1954  G. L. HERVERT  2,697,031
SULFONATION APPARATUS
Filed March 29, 1951

INVENTOR:
GEORGE L. HERVERT
BY:
ATTORNEYS:

United States Patent Office

2,697,031
Patented Dec. 14, 1954

---

2,697,031

SULFONATION APPARATUS

George L. Hervert, Downers Grove, Ill., assignor to Universal Oil Products Company, Chicago, Ill., a corporation of Delaware Application March 29, 1951, Serial No. 218,189

3 Claims. (Cl. 23—284)

---

This invention relates to a process and apparatus for the sulfation and sulfonation of organic compounds, particularly compounds which acquire an undesirable dark color during the sulfonation reaction, as in the case of the alkyl aryl hydrocarbons, the sulfonic acid and sulfonate salt derivatives of which are utilizable as surface active agents and detergents. More specifically, the present invention provides a method of sulfonation or sulfation of organic compounds to form products having very little or no color and little or no unconverted starting materials by means of a process which comprises contacting at controlled temperature conditions a spray of the organic compound with vaporized sulfur trioxide diluted with an inert gas.

It is well established that in the manufacture of detergents from alkyl aryl hydrocarbons or aliphatic alcohols by the sulfonation or sulfation thereof, respectively, followed by neutralization of the resulting sulfonic acid and sulfate ester, if desired, it is desirable from the standpoint of consumer appeal to produce a material having a minimum of color, a substantially white or colorless product being the most desirable and in greatest demand. What is true for detergents and surface active agents designed for use in the household laundry, etc., is also true in the manufacture of many other commercial sulfate and sulfonate products, whether utilized directly in public consumption or utilized as a starting material for the manufacture of other products in which the color bodies ultimately appear as an undesirable component. The present invention is particularly concerned with a process and an apparatus therefor utilizable in the production of the sulfate and sulfonic acid derivatives of sulfonatable organic compounds which are peculiarly sensitive to color degradation at sulfonation temperatures. The present sulfonation process and apparatus therefor is further characterized by their simplicity of operation, and their efficiency from the standpoint of being capable of effecting substantially complete conversion of the starting material to the sulfonic acid or sulfate derivative thereof.

In one of its embodiments, the present invention concerns an improvement in the process for sulfonating a sulfonatable organic compound which comprises passing an inert carrier gas through a bulk supply of sulfur trioxide at a temperature and at a rate sufficient to vaporize a definite quantity of sulfur trioxide, passing the resultant dilute sulfur trioxide stream into a sulfonation-mixing zone, concomitantly spraying said sulfonatable organic compound into said sulfonation-mixing zone to form a mixture of intimately dispersed sulfur trioxide vapor, finely divided droplets of said sulfonatable organic compound and said inert gas, maintaining said sulfonation-mixing zone at sulfonating reaction conditions, thereafter passing said mixture into a separation zone of enlarged cross section and therein separating the gaseous components of the reaction mixture from the liquid portion thereof.

Another embodiment of the invention concerns an improved apparatus for effecting sulfation and sulfonation reactions utilizing a sulfonating agent containing sulfur trioxide which comprises an enclosed chamber having a reactant stream inlet port, a liquid product outlet port, and a vapor and gas outlet port, a first conduit means terminating with a spray nozzle in said inlet port suitable for introducing a spray of finely divided droplets of a sulfonatable organic compound into said chamber, a second conduit means terminating with an orifice adjacent to said spray nozzle suitable for introducing a stream of sulfur trioxide suspended in an inert carrier gas into said chamber, a baffling means positioned in said chamber adjacent to said inlet port in such position relative to the inlet port that the resulting stream of mixed sulfur trioxide, inert gas, and sulfonatable organic compound contacts said baffling means, and said outlet port providing an exit for unreacted vapor and inert gases from said chamber.

Other objects and embodiments of the invention relating to specific aspects of the process and apparatus will be referred to in greater detail in the following further description of the invention.

It is generally recognized in the chemical arts that certain organic componds and certain classes of organic compounds are sensitive to color changes upon sulfonation. Some compounds, particularly of aromatic or unsaturated olefinic or polyolefinic structure, form undesirable by-product polymers or oxidation products having tar-like properties which contaminate the final product with color bodies varying from light cream to dark brown in color. Such colored contaminants are particularly undesirable in products intended for human use where consumer appeal is a decided factor in the wide acceptance of the product by the consuming public. Such considerations are especially operative in the commercial manufacture of detergents where a highly-colored detergent product represents the antithesis of detergency. A group of detergents having sulfonate or sulfate radicals in the structure of the detergent molecule, and particularly their alkali metal salts, are widely acepted as effective detergents, especially for use in hard water. Typical of representative sulfated and sulfonated compounds having detergent properties include the long chain alcohol sulfates, such as the sodium salts of the acid sulfate esters of lauryl alcohol, the long chain alkyl aryl sulfonates, containing alkyl groups having from about 9 to about 18 carbon atoms per group, the alkyl phenol sulfonates having similarly long chain alkyl groups, the long chain fatty acid ester sulfates and their alkali metal salts, such as the oleic acid glyceride sulfates, and others. A highly effective method of producing sulfated and sulfonated compounds of this structure, as well as other sulfated and sulfonated products, involves contacting the starting material at sulfonation reaction conditions with free sulfur trioxide, thereby producing the corresponding sulfate or sulfonic acid derivative which may be converted to the corresponding salts by neutralization with a suitable base, such as an alkali metal hydroxide. The general experience of the art in the use of liquid sulfur trioxide as a sulfonating agent has been that although substantially quantitative yields of sulfonated product are realized, the sulfonic acid intermediate is nevertheless contaminated with undesirable, highly colored impurities, even though only stoichiometric or only a slight excess of the sulfur trioxide sulfonating agent is utilized. Presumably, both the advantage of the high yield of product and the disadvantage of the undesirable color of the product, are believed to be caused by the extreme activity of sulfur trioxide as a sulfonating reagent. The present process, which effects sulfonation of even color-sensitive starting materials with sulfur trioxide in a gaseous form diluted with an inert carrier gas under conditions such that the temperature is rigidly controlled within the range of optimum limits takes advantage of the high yields of sulfate or sulfonic acid product obtained when sulfonating in the presence of sulfur trioxide with none of the disadvantages of undesirable color formation. In the present process, the sulfonatable organic compound is introduced into the sulfonation zone in the form of finely divided particles and the sulfur trioxide is supplied to the reaction zone in the form of dispersed molecules of vapor suspended in an inert carrier gas. The resultant dilution of the reactants permits rapid dissipation of the highly exothermic heat of the sulfonation reaction to the surrounding inert gaseous medium and the tendency of the sulfonatable compound to oxidize and/or polymerize to form colored by-product impurities does not occur to any substantial degree. Furthermore, the presence of the sulfur trioxide in dilute form minimizes or substantially eliminates the undesirable production of poly-sulfonated derivatives which are particularly unsuitable as detergent intermediates. The inert gas which serves the purpose as a carrier for the sulfur trioxide into the sulfonation zone may also be recycled to the sulfur trioxide pickup zone and thus may be continuously used in the system with little or no load on the refrigeration capacity of the system.

Suitable charging stocks or starting materials which may be sulfated or sulfonated by means of the present procedure are characterized herein as sulfonatable organic compounds, although the method is particularly advantageous when applied to the sulfonation of aromatic compounds, and especially alkyl aromatic hydrocarbons as hereinafter specified for the formation of the corresponding sulfonic acid derivatives utilizable as detergent intermediates. Organic compounds within the broad class of charging stocks include such compounds as the phenols, and alkyl phenols; alcohols of both the aliphatic and cyclo-aliphatic series; aromatic hydrocarbons such as the various benzene derivatives containing a nuclearly displaceable hydrogen atom, and the polycyclic aromatic hydrocarbons containing naphthyl, phenanthryl, and anthryl, nuclei; olefinic hydrocarbons such as octene, decene, etc.; cycloolefins and their alkyl substituted derivatives, such as cyclohexene and ethylcyclohexene; heterocyclic compounds such as thiophene, pyridine, and the like; ethers and esters, such as phenylmethyl ether and the fatty acid glycerides respectively, the latter class including such compounds as the glyceride mono-esters of oleic acid, etc.; acids, such as benzoic acid; and various derivatives of the above classes of compounds containing substituents such as one or more radicals of the group: halo, nitro, amino, keto, carboxyl, etc. The advantages of the present method of sulfonation are especially evident in the production of alkyl aromatic sulfonic acids, which when neutralized with a suitable basic reagent such as an alkali metal hydroxide, an amine or an alkanol amine form highly effective detergent compounds. In the latter application of the method, the control of the reaction temperature during sulfonation is especially important and the method herein provided for effecting sulfonation of the charging stock yields the sulfonic acid product at a relatively low temperature, thereby eliminating the development of color bodies and dealkylation of the alkyl aromatic hydrocarbon starting material which ordinarily occurs when the temperature is not controlled. Suitable alkyl aromatic hydrocarbons sulfonatable by the present process to produce detergent intermediates include not only the alkylated polycyclic aromatic compounds, such as nonylnaphthalene, but also, and preferably, the alkyl benzenoid hydrocarbons wherein the alkyl group contains from about 9 to about 18 carbon atoms per group, represented for example, by dodecyltoluene.

The present process is designated for convenience as a sulfonation reaction, although in the case of certain organic compounds containing a reactive hydroxyl group in the structure of the compound, the product contains a sulfate rather than a sulfonic acid substituent and the reaction is characteristically a sulfation rather than a sulfonation reaction. In designating the present reaction herein as being one of sulfonation, it is intended that the scope of such term be extended to generically designate sulfation reactions as well as strictly sulfonation reactions, the process in either case resulting in the substitution of the sulfo radical in the molecule of the initial starting material.

The material herein designated as the inert carrier gas in which the vaporized sulfur trioxide sulfonating agent is suspended is more specifically characterized as a substance which is a gas or vapor at the particular sulfonation conditions and which does not react to any substantial degree at the specified sulfonation conditions with either the sulfonating agent or the sulfonatable organic compound. Inert gaseous substances utilizable as the sulfur trioxide carrier gas include air, nitrogen, carbon dioxide, carbon monoxide, sulfur dioxide, or a low molecular weight paraffinic hydrocarbon, such as methane, ethane, propane, butane, or a mixture thereof with other inert gases, such as the gaseous by-product of a hydrocarbon cracking reaction containing hydrogen, methane, ethane, propane, etc. In the present operation the carrier gas is passed through a sulfur trioxide pickup zone containing a bulk supply of liquid or solid sulfur trioxide at a temperature sufficient to vaporize a sufficient quantity of the sulfur trioxide to effect the subsequent sulfonation reaction. For this purpose, the carrier gas may be merely bubbled into a quantity of the sulfur trioxide or it may be charged into a tower containing a packing material over which the sulfur trioxide is allowed to flow in contact with the carrier gas, preferably introduced into the bottom of the tower. Since the carrier gas is essentially inert in the present sulfonation process and since it generally contains some sulfur trioxide which fails to react with the sulfonatable organic compound in the sulfonation zone, it is preferably recycled at least in part to the sulfur trioxide pickup zone as the carrier gas is removed from the sulfonation zone following the reaction.

The active component of the present sulfonating agent mixed with the inert carrier gas is sulfur trioxide in any of its various physical modifications, although the gamma form, as hereinafter specified, is generally preferred in the present process. Sulfur trioxide has become available commercially in three forms, the so-called alpha form (a solid asbestos-like material melting at about 62° C., generally considered to be a sulfur trioxide polymer), the beta-form, also a polymeric solid at normal temperatures melting at about 33° C., and the gamma-form, a normally liquid modification of sulfur trioxide at room temperatures containing a large proportion of monomeric sulfur trioxide and melting at about 17° C. A stabilized gamma-form manufactured commercially under the trade name "Sulfan" contains an inhibitor which maintains the sulfur trioxide in liquid condition at temperatures higher than its melting point. The various forms of sulfur trioxide have sufficient vapor pressures at the present operating temperatures such that significant quantities thereof are vaporized by passing the inert carrier gas into a pickup zone containing the sulfur trioxide, even at temperatures as low as 10° C. At equilibrium conditions, the quantity of sulfur trioxide present in the carrier gas is constant at uniform temperature and contact conditions between the carrier gas and the bulk supply of sulfur trioxide, and it is therefore possible to control the relative proportion of sulfur trioxide and sulfonatable organic compound introduced into the sulfonation reactor by maintaining the flow of carrier gas continuous at a predetermined constant rate and temperature through the sulfur trioxide pickup zone while maintaining the supply of sulfonatable organic compound to the sulfonation zone at a given constant value.

In accordance with the present method of effecting the sulfation and sulfonation of organic compounds, the sulfonatable organic compound is supplied to the sulfonation zone in the form of finely divided droplets, produced, for example, by means of a spray nozzle, and is mixed in said sulfonation zone with the carrier gas containing the sulfur trioxide sulfonating agent. The resulting mixture of sprayed droplets of sulfonatable organic compound and dilute sulfur trioxide gas as an intimately dispersed mixture thereof is led into an expanded enclosure, preferably a cyclone separator, maintained at the desired sulfonation temperature wherein the finely divided droplets of sulfonatable organic compound react further with the sulfur trioxide, forming a liquid sulfonic acid or sulfate intermediate product which is allowed to precipitate by gravitational and centrifugal forces from the carrier gas on the walls and interior surfaces of the sulfonation chamber and/or are collected on the surface of a baffle interposed in the stream of incoming reactants in such position relative to the incoming gases that the surface is substantially adjacent to the inlet port and collects a major proportion of the sulfonic acid product. Although a cyclone separator is the preferred form of separating chamber wherein the liquid droplets of sulfonic acid or sulfate product may be recovered from the gas phase, a simple expanded enclosure wherein the velocity of the gases and liquid droplets are substantially reduced may serve as a suitable separating chamber.

A particularly preferred form of the apparatus utilizable in the present process and an operable procedure therefor is shown in the accompanying diagram which illustrates an apparatus comprising a centrifugal separator as one of the preferred modifications of the sulfonating-separating zones of the apparatus. The diagram represents a side plane elevational view across section 2—2 of the centrifugal separator. For the sake of simplicity, the diagram will be described with reference to the sulfonation of an alkyl aromatic hydrocarbon utilizing air as the inert carrier gas and liquid sulfur trioxide as the sulfonating agent. It is to be emphasized in thus basing the description on a particular charging stock and a specific method of operation, that it is not intended to thereby limit the scope of the present invention in strict accordance therewith. At other conditions of operation and utilizing other charging stocks, the procedure and apparatus may be modified in any designated manner to effect sulfonation of the sulfonatable compounds hereinabove referred to.

Referring to the accompanying diagram, Figure 1, the sulfonatable organic compound, which for the purpose of the present description is an alkyl aromatic hydrocarbon, is introduced into the process flow through line 1 into a reservoir, vessel 2, containing a bulk supply of the alkylate, desirably maintained for continuous operation of the process. The alkylate is withdrawn from tank 2, as required, through conduit 3 by means of pump 4 which discharges the alkylate under pressure into conduit 5 terminating at the end of the conduit with spray nozzle 7 within mixing zone 6 wherein it is mixed with sulfur trioxide suspended in a carrier gas as hereinafter described. Spray nozzle 7 is preferably a high pressure type capable of producing finely divided droplets of the alkylate although any suitable form and type such as commonly employed in the chemical manufacturing arts may be utilized to produce droplets of finely divided size within mixing zone 6. Conduit 5 entering mixing zone 6 is preferably disposed in a forward direction to provide a uni-directional forward thrust to the flow of reactants and reagents entering mixing zone 6, although the latter provision is optional when utilizing the present apparatus, herein described, since the reagents and reactant streams normally flow in this direction due to the lower pressure on the forward end of mixing zone 6. As the sulfonatable alkylate is sprayed into the zone 6, an inert gas, such as air, is pumped by means of compressor 9 from the atmosphere through conduit 8 or from the stack gas return conduit 22 through recycle line 24 connecting with conduit 8 and is discharged by means of conduit 10 into a bulk supply of liquid sulfur trioxide contained in reservoir 11, and is preferably bubbled into the liquid sulfur trioxide below the surface thereof in order to entrain a larger quantity of sulfur trioxide vapor therein. The inert gas laden with sulfur trioxide vapor is introduced into the mixing chamber 6 through conduit 12 which may also terminate in a high pressure nozzle at the end thereof to direct the stream of sulfur trioxide and inert gas in a forward direction. The conduit may also terminate at a point directly adjacent to the alkylate spray nozzle to thereby effect intimate and substantially instantaneous mixing of the alkylate and sulfur trioxide. The liquid sulfur trioxide in reservoir 11 is preferably maintained at a temperature of from about 0° to about 50° C., and preferably from about 20° to about 40° C. in order to increase the vapor pressure of the liquid sulfur trioxide to a value sufficient to maintain the desired ratio of sulfonating agent to sulfonatable organic compounds introduced into mixing zone 6. When utilizing sulfonatable organic compounds resistant to sulfonation as charging stock, it is often desirable to increase the temperature of the bulk supply of sulfur trioxide to temperatures as high as 100° C. in order to enhance the rate of sulfonation and thereby increase the yield of sulfonated organic compound obtained as product.

In the sulfation or sulfonation of most organic compounds with sulfur trioxide and particularly when utilizing the present spray method of contact, it is desirable to provide a sulfur acid or oleum "Heel" in the sulfonation reaction mixture to enhance the mixing of the reactants in liquid globular form which may be provided by the presence of liquid droplets of the sulfuric acid or oleum heel in the mixing zone. When utilized in the present operation, the sulfuric acid heel may be introduced into mixing zone 6 through conduit 13 containing valve 14 and spray nozzle 15 which atomizes the liquid sulfuric acid in the form of a spray which contacts the other reactants at a point closely contiguous to the spray nozzles at the ends of the alkylate and sulfur trioxide conduits. The sulfuric acid heel for this purpose is desirably a relatively concentrated acid containing at least 95% sulfuric acid, and oleums containing up to about 60% by weight of free sulfur trioxide.

Although single conduit means for conveying the respective sulfur trioxide and alkylate streams into mixing zone 6 are illustrated in Figure 1, more intimate mixing of the reactants in the desired proportion, may be obtained by utilizing a series of multiple conduits or a single conduit for each stream terminating in a series of multiple spray nozzles in mixing zone 6. The multiple nozzles may likewise be positioned in zone 6 in an annular arrangement around a conduit carrying another reactant or the sulfur trioxide-air stream may be introduced into zone 6 through a gas atomizing nozzle, the alkylate or other liquid organic reactant being atomized into fine droplets and mixed with the SO₃ air stream by the injector type action of the nozzle.

The mixture of sprayed droplets of reactants, intimately mixed with the air-sulfur trioxide stream in mixing zone 6 are discharged by virtue of the forward thrust of the individual sprays entering the mixing zone through a reactant stream inlet port into an enlarged chamber, preferably a cyclone separator, wherein the liquid droplets of sulfate or sulfonic acid product are separated from the inert carrier gas by means of settling or precipitation, on the sides of the chamber or on the surface of a baffle interposed in the stream of atomized particles and gases injected from zone 6 into the chamber wherein they are collected for withdrawal from the reaction zone. In accordance with the preferred apparatus and method of operating the present process, the sprayed droplets of the reactants and product enter separating chamber 16 tangentially, thereby providing a centrifugal motion to the sprayed droplets carried in the stream of inert gas. For this purpose chamber 16 is preferably cylindrical in shape characteristic of convention cyclone separators. Mixing zone 6 is generally an enclosed tube connecting with the inlet port of chamber 16 and may be of any desired length, although preferably is as short as possible to reduce settling of the droplets of reactants or product in the mixing zone. It may be open at the end opposite the point of attachment to the inlet port to admit recycle inert gas from the vent stack as hereinafter described. A spray of water may also be injected into the mixing zone at a point following complete mixing of the sulfur trioxide and sulfonatable organic compound in order to terminate the reaction and/or central the temperature.

The baffling means present in the preferred form of the present apparatus provides a collecting surface within separating chamber 16 contiguous to the inlet port upon which the entering stream of atomized droplets of sulfonic acid or sulfate product, together with any unreacted liquid reactants from mixing zone 6, accumulate and are thereby separated from the inert gas and residual sulfur trioxide vapor. The baffle also increases the residence time of the reactants in contact with the sulfur trioxide. This baffling means at the inlet port of the separating chamber may be of any shape or form, but is desirably a sphere or cylinder upon which the gases and droplets impinge and the liquid droplets coalesce to form a free-flowing film of the sulfonic acid or sulfate product which drips from the surface of the baffle and flows out of the separating chamber through the outlet port therefor. When utilizing a cylinder or sphere as the baffling means, it may be slowly rotated, for example, in a counter-clockwise direction and the sulfonated product scraped from the surface of the cylinder at the side opposite the incoming stream of reactants. The preferred form of baffling means in the present apparatus is provided by a rotating cylinder mounted vertically with respect to its longitudinal axis in the inlet port. The baffling means upon which the stream of sprayed and gaseous reactants impinge may be provided by a hollow, three dimensional enclosure through which a liquid or gaseous refrigerant may be circulated to further control the temperature of sulfonation and dissipate the exothermic heat of sulfonation. Thus, a cold brine solution or solid carbon dioxide may be placed or circulated in the hollow cylinder or sphere to control the temperature at the desired level. In addition to such methods of controlling the temperature and eliminating undesirable side reactions, the reaction may be controlled or terminated by injecting a stream of water on the collecting surface. Although in most sulfonation reactions, the reactants subject to sulfonation also produce products which undergo discoloration if the temperature is not controlled within specified limits, certain organic compounds may be sulfonated at relatively high temperatures, up to about 100° C. without undergoing deleterious discoloration. The present apparatus and process is applicable to such high temperature sulfonation reactions, but is particularly adapted to color-sensitive compounds, usually sulfonated at temperatures of from about 20° to about 50° C. The present apparatus and process may be modified for such variety of charging stocks by maintaining sulfonation-mixing zone and/or chamber 16 at the particularly preferred temperature for a given charging stock. A simplified form of the baffling means is illustrated in Figure 1 and the corresponding parts by a top view thereof in Figure 2, comprising a rotating cylinder 17 mounted near the outer perimeter of the cyclone separator with the longitudinal axis of the cylinder in a vertical position on brackets 18 directly in the stream of the incoming reactants, such that the latter impinges on the surface of the cylinder.

The liquid droplets of sulfate or sulfonic acid product, separated by the action of centrifugal forces on the particles introduced tangentially with the gaseous components into the separating chamber or cyclone separator, collect on the inner surfaces of the chamber as a viscous film designated at 19 on Figure 1 and/or on the surface of the cylinder baffle, the film flowing downwardly through product sulfonic acid or sulfate ester outlet port 20. Alternatively the product may be allowed to accumulate in chamber 16 and pumped therefrom. The product may be thereafter suitably treated, depending upon the end product desired. For example, it may be neutralized to form the neutral salt, as in the case of detergent products, or subjected to extraction to remove the excess sulfonating agent or unreacted organic compound, if any. The inert carrier gas from which the liquid products of the process have been deposited on the inner walls of the separating chamber and which may contain unreacted sulfur trioxide vapor is removed from the separating chamber through exhaust vent 21, preferably through an exhaust outlet port at the end of an elongated extension of the vent pipe which extends into the lower portion of the cyclone separator. The exhaust gases may be vented through a stack, but since the gas may carry appreciable quantities of unreacted sulfur trioxide vapor, they are preferably recycled to the mixing zone 6 through return duct 22 in controlled amounts as determined by damper 23, positioned in conduit 22 to control the flow of gases vented from the apparatus, thereby controlling the flow rate through conduit 22 for recycle purposes. The exhaust gases may also be recycled to the sulfur trioxide pickup zone and enriched with additional sulfur trioxide by recycling through conduit 24, connecting with inert gas intake line 8, and thereafter bubbled into the sulfur trioxide bulk supply in vessel 11, as hereinbefore decided.

Figure 2:
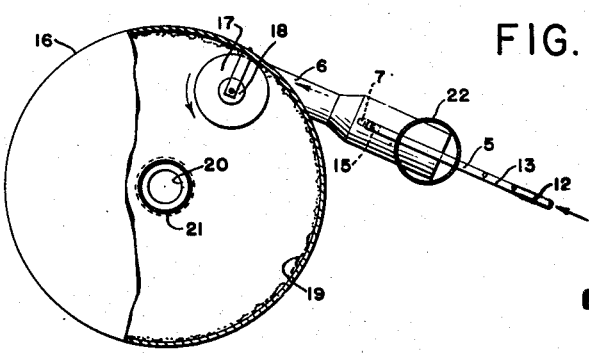

Figure 2 represents the top view of the cyclone separator portion of the apparatus taken at section 2—2 of the side plane elevational view in Figure 1. Ports designated at 5, 12, and 13 in Figure 2 represent the corresponding conduits of Figure 1 for the sulfonating agent, the alkyl aromatic hydrocarbon charging stock and the sulfuric acid "heel" respectively. Mixing zone 6 of Figure 1 is represented by the corresponding designation in Figure 2, indicating the preferred tangential location of the inlet reactant stream conduit. The rotating cylinder 17 comprising one embodiment of the baffling means rotates in brackets 18 fixed in position by support from the top or side of the cyclone separator. The wall of the cyclone separator is represented in Figure 2 by 16 and 19 represents the film of sulfonic acid or sulfate product collecting on the inner surface of the cyclone separator enclosure. The top view of the exhaust duct for the inert gas and residual sulfur trioxide vapors rising through the center of the cyclone separator from the bottom portion thereof is represented diagrammatically as 21.

The sulfonatable organic compound sprayed into sulfonation zone 6 in the above described diagram may be diluted with an inert liquid prior to its introduction into the sulfonation zone, and for such purpose a low boiling, inert, organic liquid which evaporates at the upper limit of the desired sulfonation temperature may be utilized, thus providing a further means for controlling the reaction temperature by dissipation of the exothermic heat through evaporative cooling. In the case of utilizing an alkyl aromatic charging stock, a suitable inert organic liquid may comprise a low boiling paraffinic hydrocarbon such as liquid butane, pentane, hexane, etc. or a paraffin halogen substituted compound, such as chloroform, carbontetrachloride, perfluorobutane, perfluoropentane, etc.

The present invention is further illustrated in one of its embodiments in the following example utilizing apparatus similar to that described in Figure 1, above.

Dodecyltoluene charging stock was introduced into the mixing or sulfonation zone of an apparatus similar to the unit in Figure 1, described above, in the form of finely divided droplets produced by means of high pressure spray nozzle of the small hollow-cone, tangential type and was mixed in the sulfonation zone with an air-sulfur trioxide stream and a sulfuric acid spray, the flow rates of which were adjusted to provide a mixture containing approximately 1.5 moles of sulfur trioxide per mole of dodecyltoluene and about 10 parts of sulfuric acid of 98.5% concentration per 100 parts of dodecyltoluene. The mixing zone was attached tangentially to the inlet port of a cyclone separator and a rotating cylinder was placed in a position directly adjacent to the outer wall of the cyclone separator in the dodecyltoluene-air-sulfur trioxide stream. The dodecyltoluene and sulfuric acid were introduced into the mixing zone at a temperature of about 10° C. and the rotating cylinder contained a circulating brine solution cooled to approximately 0 to 10° C. The sulfonic acid product collected on the surface of the rotating cylinder and dripped from the bottom of the cylinder into the lower portion of the cyclone separator. The exhaust gas contained a small quantity of sulfur trioxide vapor and was recycled to the air inlet of the sulfur trioxide pickup vessel. The dodecyltoluene sulfonic acid product was removed from the bottom of the cyclone separator and was neutralized with an aqueous 30% caustic solution. On evaporating the liquid, neutralized product to dryness, it was substantially colorless and had excellent detergency. Approximately 98% of the dedecyltoluene charging stock was sulfonated by this procedure.

In a method of sulfonation utilizing liquid sulfur trioxide directly and contacting the same in its liquid form at 0 to 10° C. with dodecyltoluene or when utilizing a 30% oleum as sulfonating agent, the neutralized sulfonate product was produced in lower yields, generally from about 92 to about 95% of the dodecyltoluene charged to the reaction and its color varied from tan to dark shades of brown, depending upon the sulfonation temperature.

I claim as my invention:

1. A sulfonation apparatus comprising a cylindrical chamber, an inlet conduit connected tangentially to the upper portion of the chamber, a drum baffle mounted for rotation within the chamber adjacent the tangential inlet, a fluid-conveying pipe line terminating in a spray nozzle in said inlet conduit, a second fluid-conveying pipe line terminating in an orifice in the inlet conduit adjacent said spray nozzle, whereby incoming fluid streams are merged in said conduit for discharge into said chamber against the rotatable drum baffle therein, and means for removing reaction products from the chamber.

2. A sulfonation apparatus comprising a vertically disposed separating chamber, a substantially horizontal mixing chamber connected tangentially to the upper portion of the separating chamber, a drum baffle mounted for rotation within the separating chamber adjacent the point of connection of the mixing chamber to the separating chamber, means for introducing a plurality of fluid streams into the mixing chamber and for directing the commingled fluids from the mixing chamber into the separating chamber against said baffle, and means for removing reaction products from the separating chamber.

3. A sulfonation apparatus comprising a vertically disposed separating chamber, a substantially horizontal mixing chamber connected tangentially to the upper portion of the separating chamber, a drum baffle mounted for rotation within the separating chamber adjacent the point of connection of the mixing chamber to the separating chamber, a fluid inlet conduit terminating in a spray nozzle within said mixing chamber, means for introducing a second fluid to the mixing chamber adjacent said nozzle for admixture with the fluid from said inlet conduit, said spray nozzle being directed toward the separating chamber whereby to discharge the commingled fluids from the mixing chamber into the separating chamber against said baffle, and means for removing reaction products from the separating chamber.

(References on following page)

References Cited in the file of this patent

UNITED STATES PATENTS

| Number | Name | Date |
|---|---|---|
| 1,621,475 | Cross | Mar. 15, 1927 |
| 1,629,200 | Buhtz | May 17, 1927 |
| 1,710,143 | Black et al. | Apr. 23, 1929 |
| 1,859,992 | Seil | May 24, 1932 |
| 1,956,571 | Grillet | May 1, 1934 |
| 2,304,221 | Walsh | Dec. 8, 1942 |
| 2,384,455 | Daley et al. | Sept. 11, 1945 |
| 2,514,733 | Vold et al. | July 11, 1950 |
| 2,523,582 | Mattson | Sept. 26, 1950 |
| 2,572,605 | Fincke | Oct. 23, 1951 |

FOREIGN PATENTS

| Number | Country | Date |
|---|---|---|
| 881,876 | France | Feb. 4, 1943 |